United States Patent [19]
Tempest et al.

[11] Patent Number: 5,593,230
[45] Date of Patent: Jan. 14, 1997

[54] AIR BEARING

[75] Inventors: Michael C. Tempest, Dorset, United Kingdom; Florin Dimofte, Fair View Park, Ohio

[73] Assignee: Westwind Air Bearings Limited, Dorset, United Kingdom

[21] Appl. No.: 545,776
[22] PCT Filed: May 31, 1994
[86] PCT No.: PCT/GB94/01176
§ 371 Date: Nov. 27, 1995
§ 102(e) Date: Nov. 27, 1995
[87] PCT Pub. No.: WO94/28323
PCT Pub. Date: Dec. 8, 1994

[30] Foreign Application Priority Data

Jun. 1, 1993 [GB] United Kingdom ............ 9311231

[51] Int. Cl.$^6$ .................................... F16C 32/06
[52] U.S. Cl. ............................. 384/100; 384/118
[58] Field of Search .................... 384/100, 114, 384/118, 107, 111

[56] References Cited

U.S. PATENT DOCUMENTS

| | | | |
|---|---|---|---|
| 3,601,459 | 8/1971 | Cutting | 384/100 |
| 4,602,873 | 7/1986 | Izumi et al. | 384/118 X |
| 4,747,705 | 5/1988 | Agrawal | 384/118 |
| 4,834,559 | 5/1989 | Kalvoda | 384/118 |

*Primary Examiner*—Thomas R. Hannon
*Attorney, Agent, or Firm*—Shoemaker and Mattare, Ltd.

[57] ABSTRACT

An air bearing having a non-circular bearing having a longitudinal bearing axis, and a plain cylindrical horizontal shaft rotatably mounted in the bearing, wherein the bearing surface when developed into a flat plane, has a shallow sinusoidal wave form including at least three wave peaks, one of the peaks having a groove therein, extending longitudinally, parallel to the bearing axis.

4 Claims, 1 Drawing Sheet

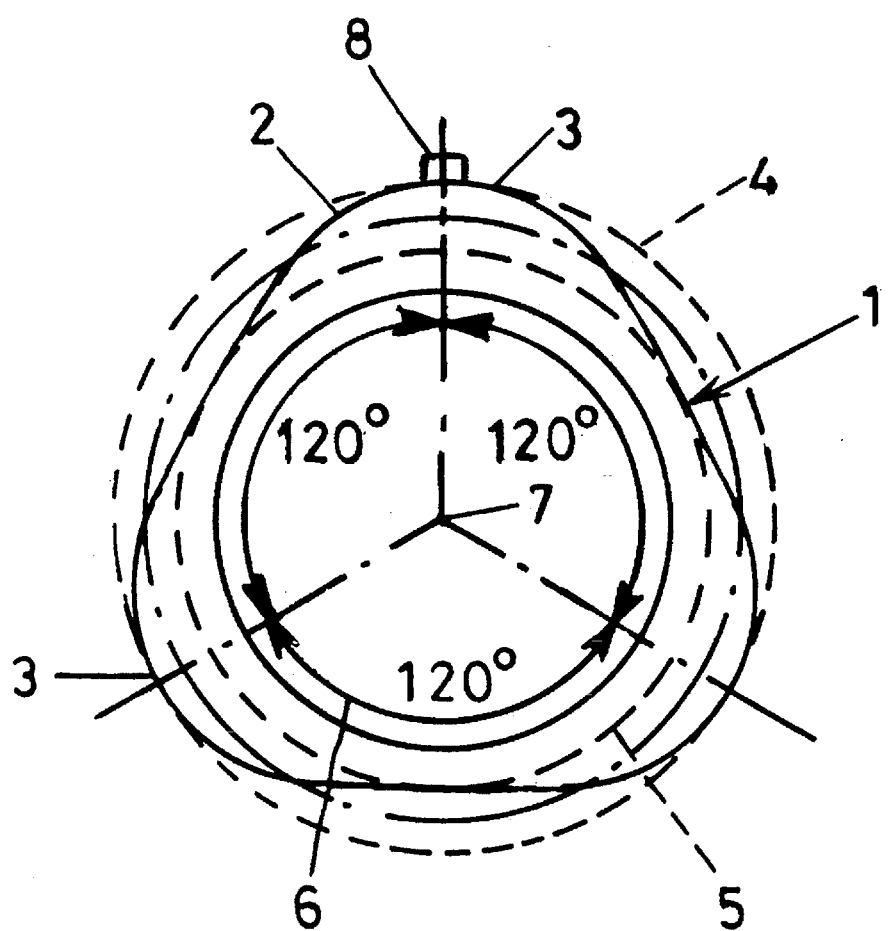

AIR BEARING

This invention relates to air bearings and more particularly to an improved aerodynamic bearing.

BACKGROUND OF THE INVENTION

Self acting aerodynamic bearings have been known since 1940 which comprise a plain cylindrical horizontal shaft which is rotatable in a plain cylindrical bearing with a small radial clearance between the two. The pressure profile within the bearing is modified by the nature of the shearing of a gas film as it passes through the convergent/divergent passage, the passage being created automatically by the weight of the shaft.

As the speed of the shaft is increased the shaft moves progressively towards, but never quite reaching, a truly concentric condition. At a certain speed, the bearing has the disadvantage that a serious instability suddenly develops where the centre of the rotating shaft commences to rotate about the centre of the bearing at half the rotational speed of the shaft. At this point, the mechanism which created the distortion of the uniformity of pressure around the shaft is destroyed with the result that load capacity is totally lost and very rapid seizure ensues.

SUMMARY OF THE INVENTION

An aim of the present invention is to provide an improved air bearing which mitigates and overcomes the above disadvantage.

According to the present invention there is provided an air bearing comprising a plain cylindrical horizontal shaft rotatable in a non-circular bearing, wherein the developed form of the bearing surface into a flat plane is in a shallow sinusoidal wave form having at least three wave peaks, the peak of one wave having a groove extendingly longitudinally parallel to the bearing axis.

Preferably, the bearing has three or five waves.

Conveniently, the bearing surfaces between the waves lie on a minor diameter of the bearing and the peaks of the waves on a major diameter.

In a preferred construction of the air bearing the peaks of the waves are arranged at 120° to an adjacent peak about the bearing axis.

BRIEF DESCRIPTION OF THE DRAWINGS

An embodiment of an air bearing, according to the invention, will now be described by way of example only, with reference to the accompanying drawing showing a diagrammatic axial cross-section through the bearing.

DESCRIPTION OF THE PREFERRED EMBODIMENT

The improved aerodynamic air bearing 1 has a non-circular form, the bearing surface 2 when developed into a normally flat plane is in a shallow sinusoidal contour having three peaks 3. The peaks 3 are located on a major diameter 4, shown in dotted line, while the intermediate bearing surfaces between the peaks lie on a minor diameter 5 shown in dotted line.

A cylindrical shaft 6 rotates about an axis 7 passing along the center of the bearing 1. The wave peaks 3 are arranged at 120° to an adjacent peak.

The top peak is formed with a groove 8 extending longitudinally parallel to the bearing central axis 7.

The improved bearing eliminates half speed whirl instability within the operating speed range of an aerodynamic bearing system. The bearing not only prevents the onset of half speed whirl, but also has the significant advantage of increasiong the stiffness of the bearing when compared with a standard air lubricated bearing where shaft and bearing are both truly cylindrical. The longitudinal groove further enhances the dynamic stability of the bearing.

Although the illustrated bearing has three waves it will be understood that the number of waves can be increased for example to five.

We claim:

1. An air bearing comprising a non-circular bearing having a longitudinal bearing axis, and a plain cylindrical horizontal shaft rotatably mounted in said bearing, wherein said bearing surface, when developed into a flat plane, has a shallow sinusoidal wave form including at least three wave peaks, one of said peaks having a groove therein, extending longitudinally, parallel to said bearing axis.

2. An air bearing as claimed in claim 1, wherein said bearing has three or five wave peaks.

3. An air bearing as claimed in claim 2, wherein said bearing surfaces between said waves lie on a minor diameter of said bearing and said peaks of said waves on a major diameter.

4. An air bearing as claimed in claim 3, wherein said peaks of said waves are arranged at 120° to an adjacent peak about said bearing axis.

* * * * *